(12) United States Patent
Frost

(10) Patent No.: US 10,952,408 B1
(45) Date of Patent: Mar. 23, 2021

(54) PET BATHTUB PLATFORM WITH DETACHABLE PET WASHTUB

(71) Applicant: David J. Frost, Traverse City, MI (US)

(72) Inventor: David J. Frost, Traverse City, MI (US)

( * ) Notice: Subject to any disclaimer, the term of this patent is extended or adjusted under 35 U.S.C. 154(b) by 101 days.

(21) Appl. No.: 16/369,123

(22) Filed: Mar. 29, 2019

Related U.S. Application Data

(60) Provisional application No. 62/650,505, filed on Mar. 30, 2018, provisional application No. 62/756,663, filed on Nov. 7, 2018.

(51) Int. Cl.
| | | |
|---|---|---|
| *A01K 13/00* | (2006.01) | |
| *A47K 3/022* | (2006.01) | |
| *A47K 3/03* | (2006.01) | |

(52) U.S. Cl.
CPC .......... *A01K 13/001* (2013.01); *A47K 3/022* (2013.01); *A47K 3/03* (2013.01)

(58) Field of Classification Search
CPC ......... A01K 13/001; A47K 3/022; A47K 3/03
USPC ..... 4/546, 553, 554, 565.1, 572.1, 579, 659, 4/585, 586
See application file for complete search history.

(56) References Cited

U.S. PATENT DOCUMENTS

| | | |
|---|---|---|
| 1,879,915 A | 9/1932 | Smoot |
| 2,237,076 A * | 4/1941 | Kenney .................. A47K 3/122 4/579 |
| 2,438,979 A | 4/1948 | Short |
| 4,316,433 A | 2/1982 | Hebert |
| 5,092,001 A | 3/1992 | Ross et al. |
| 5,213,064 A * | 5/1993 | Mondine .............. A01K 13/001 4/567 |
| 5,606,751 A * | 3/1997 | Baker .................... A47K 3/122 4/579 |
| 5,974,601 A | 11/1999 | Drane et al. |
| 6,553,943 B1 | 4/2003 | Murphy |
| 8,061,304 B1 | 11/2011 | Ramsay et al. |

(Continued)

FOREIGN PATENT DOCUMENTS

ES 2384962 A1 7/2012

OTHER PUBLICATIONS

BailyBear Porta Tubby Collapsible Portable Foldable Dog Cat Bath Tub [online], Amazon.com product listing, Nov. 2017 [retrieved on May 28, 2019]. Retrieved from the Internet: <URL: https://www.amazon.com/Collapsible-Portable-Foldable-Expandable-Accessory/dp/B0763C9ZYX>.

(Continued)

*Primary Examiner* — Tuan N Nguyen
(74) *Attorney, Agent, or Firm* — Northern Michigan Patent Law, PLC

(57) ABSTRACT

A planar support platform for mounting a pet washtub on the upper rim of a conventional bathtub. The platform comprises a generally H-shaped frame with a central beam slide-adjustable on a pair of spaced cross-bars that span the width of the bathtub to rest on the bathtub upper rim. The cross-bars include downwardly-extending vertical clamping posts shorter than the height of the bathtub, and adjustably positioned on the cross-bars to engage the inner faces of the bathtub sidewalls with an outward locking force. Pet washtubs for use in combination with the platform are also disclosed, the washtub in one form having a bottom locking plate structure configured to mate with inner and outer mounting features on the platform cross-bars.

12 Claims, 13 Drawing Sheets

(56) References Cited

U.S. PATENT DOCUMENTS

| | | | |
|---|---|---|---|
| 8,757,097 B1 | 6/2014 | Autumn | |
| 2013/0198947 A1* | 8/2013 | Yeung | A47K 3/00 4/585 |

OTHER PUBLICATIONS

Flying Pig Pet Dog Cat Washing Shower Grooming Portable Bath Tub [online], Amazon.com product listing, Dec. 2015 [retrieved on May 28, 2019]. Retrieved from the Internet: <URL: https://www.amazon.com/Flying-Pig-Grooming-Portable-White/dp/B016ZBCOMY>.

Paws for Thought Booster Bath—Medium [online], Amazon.com product listing, Feb. 2013 [retrieved on May 28, 2019]. Retrieved from the Internet: <URL: https://www.amazon.com/Paws-Thought-Booster-Bath-Medium/dp/B005JXFAJ4>.

\* cited by examiner

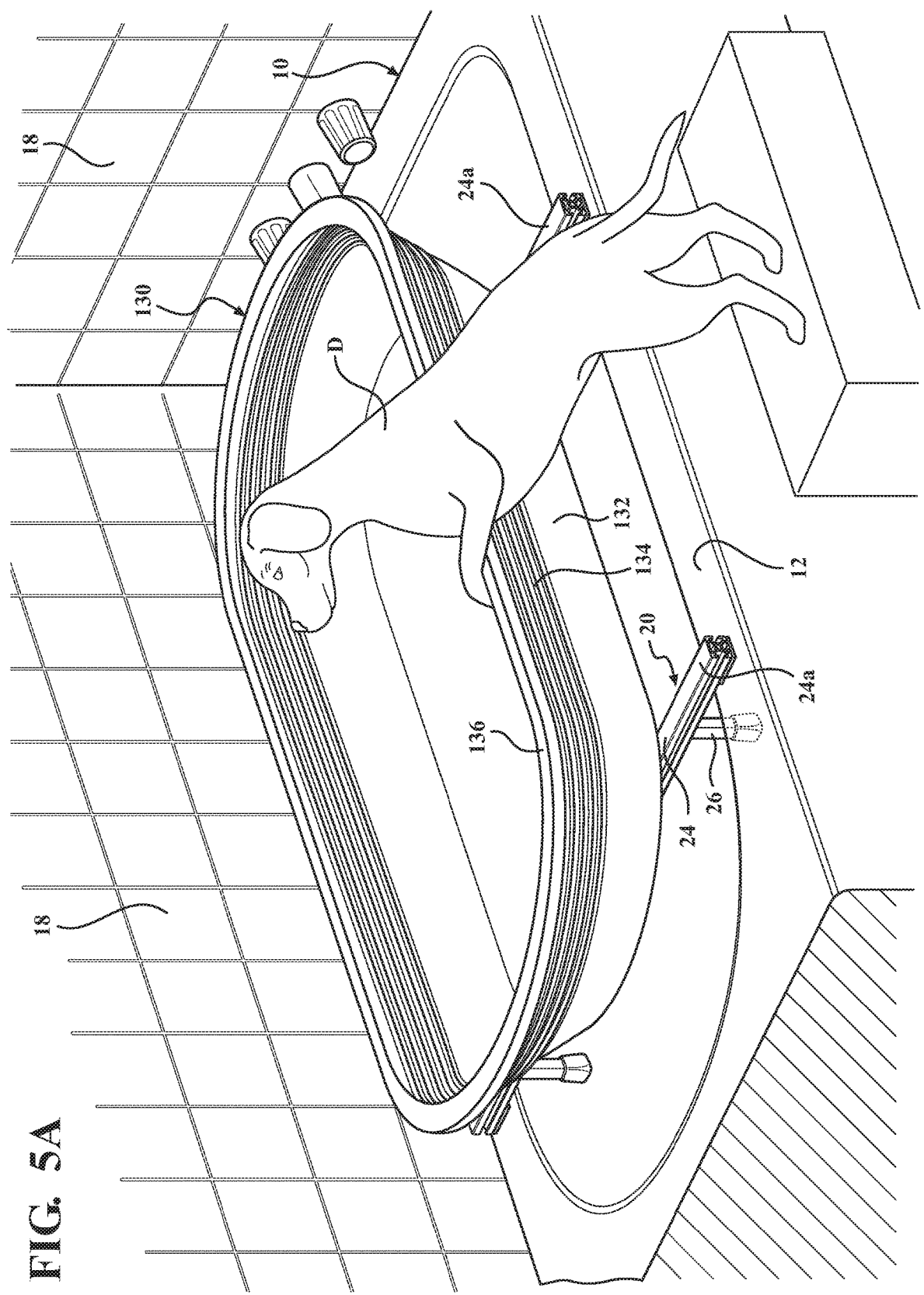

PET BATHTUB PLATFORM WITH DETACHABLE PET WASHTUB

RELATED APPLICATIONS/PRIORITY BENEFIT CLAIM

This application claims the benefit of U.S. Provisional Application No. 62/650,505 filed Mar. 30, 2018, and also claims the benefit of U.S. Provisional Application No. 62/756,663 filed Nov. 7, 2018, both by the same inventor (Frost), the entireties of which provisional applications are hereby incorporated by reference.

FIELD

The subject matter of the present application is in the field of raised washtubs for pets such as dogs.

BACKGROUND

Tubs for washing dogs and other pets at a convenient raised height are known. Commercial examples include those sold under the trademarks Booster Bath™ and Flying Pig™, both comprising plastic tubs raised on legs, and advertised for outdoor use with 360-degree access to the animal in the tub. The Booster Bath™ raised tub has a cutout in the rear tub wall for improved entry and exit, and the tub sidewall can be separated from the base for compact shipping, with a one-time, two-piece snap together connection.

U.S. Pat. No. 2,438,979 to Short shows a frame and harness for washing dogs in a bath tub, the frame expandable with screw members to press rubber caps against the inner walls of the bathtub to secure the frame in a desired position.

U.S. Pat. No. 5,092,001 to Ross et al shows an infant bathing tub with telescoping side members that expand to fit over and rest on the rim of a bathtub, and stowable legs for alternately supporting the infant tub from the bottom of the bathtub at a height level with the rim of the tub.

Spain Patent No. 2,384,962 to Campos Sanchez shows a tub for washing infants and pets, the tub body raised on a frame with telescoping tubular cross members adapted to expand over and rest on the rim of a bathtub.

It is also known to make small collapsible pet and infant washtubs. The Ningbo Big Ear Pet Products Co., Ltd. dog bath tub has a rigid oval rim supported on rigid legs, and a collapsible, corrugated silicone rubber tub body. The soft, collapsible tub body is expanded downwardly from the rim for tub use, and collapsed upwardly toward the rim for substantially flat storage. The legs fold flat against the bottom of the flattened, collapsed tub body for storage.

BRIEF SUMMARY

The present invention is an improved platform for supporting a pet (or infant, hereafter collectively "pet") washtub above the rim or upper edge of a regular bathtub. The inventive platform has improved stability, security, adjustability, and ease of access over prior art washtub stands and mounts such as those described above.

The inventive tub support platform comprises a generally H-shaped planar platform comprising at least one central longitudinal beam connecting and stabilizing two transverse cross-bars sized to span and rest upon the upper rim of a main bathtub. The cross-bars each include a pair of inner vertical clamping posts extending downwardly from the cross-bars below the bathtub rim a distance less than the height of the bathtub sidewalls. The inner vertical clamping posts are adjustably positioned on the cross-bars toward and away from each other to engage the inside of the bathtub sidewalls, in order to clamp the platform securely to the bathtub from the inside out.

When the platform is secured in place, outer ends of the cross-bars rest on the upper rim of the bathtub, and the vertical clamping posts are located inwardly of the outer ends of the cross-bars and against the inner faces of the bathtub sidewalls, for a generally right-angled, outwardly-tensioned "notch" fit with the tub sidewall and rim from the inside of the tub.

The adjustably spaced vertical clamping posts allow the support platform to be adjusted to fit different tubs from the inside out.

The upper surface of the support platform is provided with mounting features adapted to receive and removably mount a small pet washtub. The washtub mounting features may be adjustably positioned across the width of the platform, allowing the washtub to be positioned off-center, either toward or away from one side of the bathtub.

In one form the inventive tub support platform is combined with a removable pet washtub having a collapsible resilient sidewall, such that the pet washtub can be reduced in height while on the platform to make it easier for a pet to enter and exit the washtub.

In another form, the pet washtub has a rigid sidewall with at least one vertical lift-out door in one of the sides. The door has a water-resistant connection to a correspondingly shaped entry in the sidewall. In a preferred form, the upper rim of the washtub sidewall adjacent the entry has a curved rim, and an upper edge of the door comprises a pair of curved tabs for vertically engaging the curved rim. A control opening can be formed in one or both ends of the pet washtub for improved access to the bathtub water controls. One or both ends of the washtub may be shaped so that the washtub can be rested or stored vertically on end.

In a further form, the pet washtub has a rigid bottom wall or base with exterior locking plate structure attached to or formed on the outer surface of the bottom base and extending from both sides of the washtub at each end of the washtub. The locking plate structure is configured to mate at a first inner side of the washtub in substantially horizontal sliding fashion with horizontal flange mounting features on the inner ends of the cross-bars, and configured to mate at a second outer side of the washtub in vertical fashion with vertical mounting features on the outer ends of the cross-bars. In a preferred form, the locking plate structure comprises spaced plates, each spaced plate associated with one of the platform cross-bars and extending beyond the adjacent sides of the washtub.

The locking plate structure may be removably attached to the bottom of the pet washtub. The locking plate structure may comprise two spaced plates each extending across the width of the washtub, one plate located at each end of the tub in a position aligned with one of the cross-bars, and extending beyond the inner and outer sides of the washtub to engage the corresponding mounting features on the aligned cross-bar. In a preferred form, the locking plate structure is attached to the bottom wall of the pet washtub via bolts or similar connectors whose ends are covered relative to the interior of the washtub by a removable traction mat and/or molded-in protective nubs or wells. In an alternate form, the locking plate structure comprises posts that mate with sockets on the bottom of the pet washtub, in order to raise the washtub to a more convenient height above the rim of the bathtub.

In a further form, the locking plate structure comprises lateral wings spaced laterally outwardly from the inner and outer sides of the bottom of the washtub of the tub at each end of the tub in a position aligned with one of the cross-bars. In yet a further form, the lateral wing portions of the locking plate structure are also spaced vertically from the adjacent bottom portions of the washtub.

"Pet" is used herein as shorthand for various small animals, primarily dogs but including any small to medium animal capable of being bathed in a raised tub on top of a typical household bathtub.

These and other features and advantages of the invention will become apparent from the detailed description below, in light of the accompanying drawings.

BRIEF DESCRIPTION OF THE DRAWINGS

FIG. 5A is similar to FIG. 2, but shows a collapsible pet washtub according to another aspect of the invention in combination with the platform of FIG. 1, with a partially collapsed upper sidewall for ease of entry.

DETAILED DESCRIPTION

Figure 1:
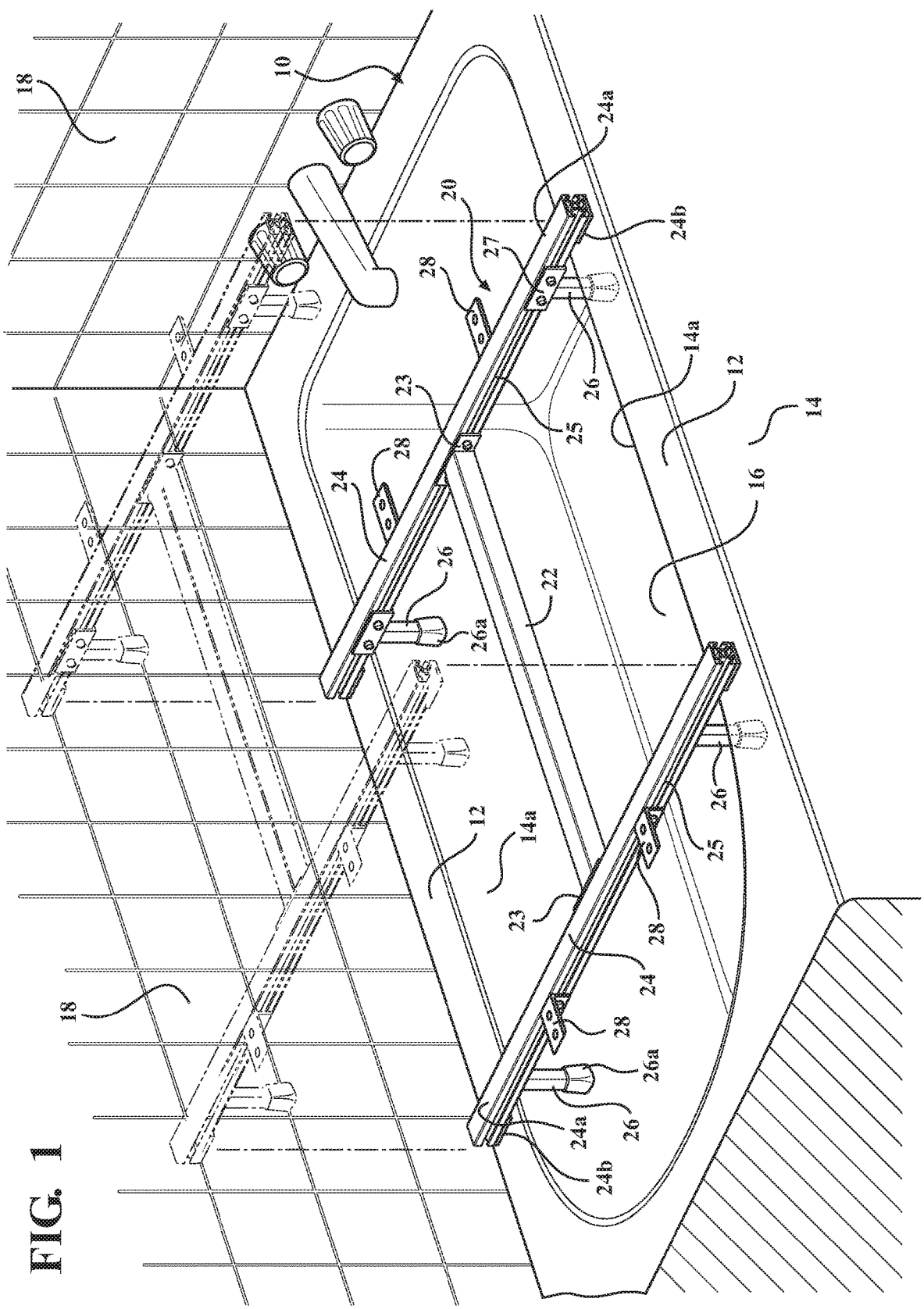
FIG. 1 is a perspective view of an exemplary pet washtub platform according to the invention, secured on (solid lines) and exploded from (broken lines) a regular household bathtub.

FIG. 1 shows an exemplary pet washtub platform 20 according to the present invention, mounted on a conventional bathtub 10. Bathtub 10 has upper side edges 12, sidewalls 14, a bottom 16, and in the illustrated example is enclosed on one side and both ends by a conventional wall surround 18. Access to the interior of bathtub 10 is accordingly from only one side, the "outer" side facing the bathroom.

It should be understood that while a non-freestanding bathtub 10 is illustrated, with access from only one side, the inventive platform 20 could be used with a freestanding bathtub or a non-surrounded bathtub as long as the bathtub has sturdy opposed sidewalls defining spaced upper side edges 12.

Platform 20 includes a central bar or beam 22 aligned with the long axis of bathtub 10, central beam 22 spacing a pair of cross-bars 24 having a width suitable to span the bathtub with their outer ends 24a resting on upper side edges 12 of the bathtub. The materials used for beam 22 and cross-bars 24 may vary, but a lightweight, strong, corrosion-resistant metal such as aluminum is currently preferred. While a single central beam 22 is illustrated, it would be possible to use multiple central longitudinal beams, if desired, as an equivalent, provided their spacing from one another is less than the width of the bathtub so that they fit between the inner sidewalls of the bathtub.

Cross-bars 24 include shorter, downwardly-extending vertical clamping posts 26 located near outer ends 24a. Vertical clamping posts 26 are functionally slidable on cross-bars 24 toward and away from outer ends 24a, for example on L-shaped slide mounts 27 connected to slide brackets 27b secured for sliding movement in elongated slots 25 formed in the cross-bars. Vertical clamping posts 26 can also be temporarily locked in position near the respective outer ends of their cross-bars, for example with locking features on the brackets 27 such as set screws or bolts 27a capable of frictionally engaging portions of the cross-bars, for example by drawing slide brackets 27b into frictional engagement against the interior sides of the outer walls of the slots 25 in a manner generally known to those in the art.

Platform 20 further includes washtub mounting features such as brackets 28 with holes suitable for connectors 28a that engage a washtub (not shown in FIG. 1) to secure the washtub to the platform. In the illustrated example the brackets 28 are aligned with the upper surfaces of the cross-bars 24, which are aligned with the upper surface of beam 22, to form a substantially planar upper surface.

In use, platform 20 is placed over bathtub 10 with vertical clamping posts 26 moved to a position interiorly of the tub sidewalls 14. The platform is lowered into position to rest outer ends 24a of cross-bars 24 on the upper sides 12 of the bathtub. The outer ends 24a may be provided on their lower surfaces with pads or cushions 24b to protect the tub surface and keep the cross-bars from sliding on the bathtub. Next, vertical clamping posts 26 are slid outwardly into contact with the inner faces 14a of the tub sidewalls 14 and then locked in place. Vertical clamping posts 26 are also preferably provided on their ends and at least partway up their outer tub-engaging sides with caps or cushions 26a of a soft, protective, frictional material to protect the surface of the tub inner sidewall faces 14a and to frictionally engage the bathtub to resist slipping. Once positioned in contact with the inner faces of the bathtub sidewalls, vertical clamping posts 26 are locked in position through slide mounts 27, for example using set screws or similar engaging the cross-bars 24 through slots 25. The vertical clamping posts 26 are preferably locked in position against the bathtub sidewalls under some outward tension for a tight fit, which can be adjusted by feel by the person installing the washtub platform on the bathtub.

Figure 2:
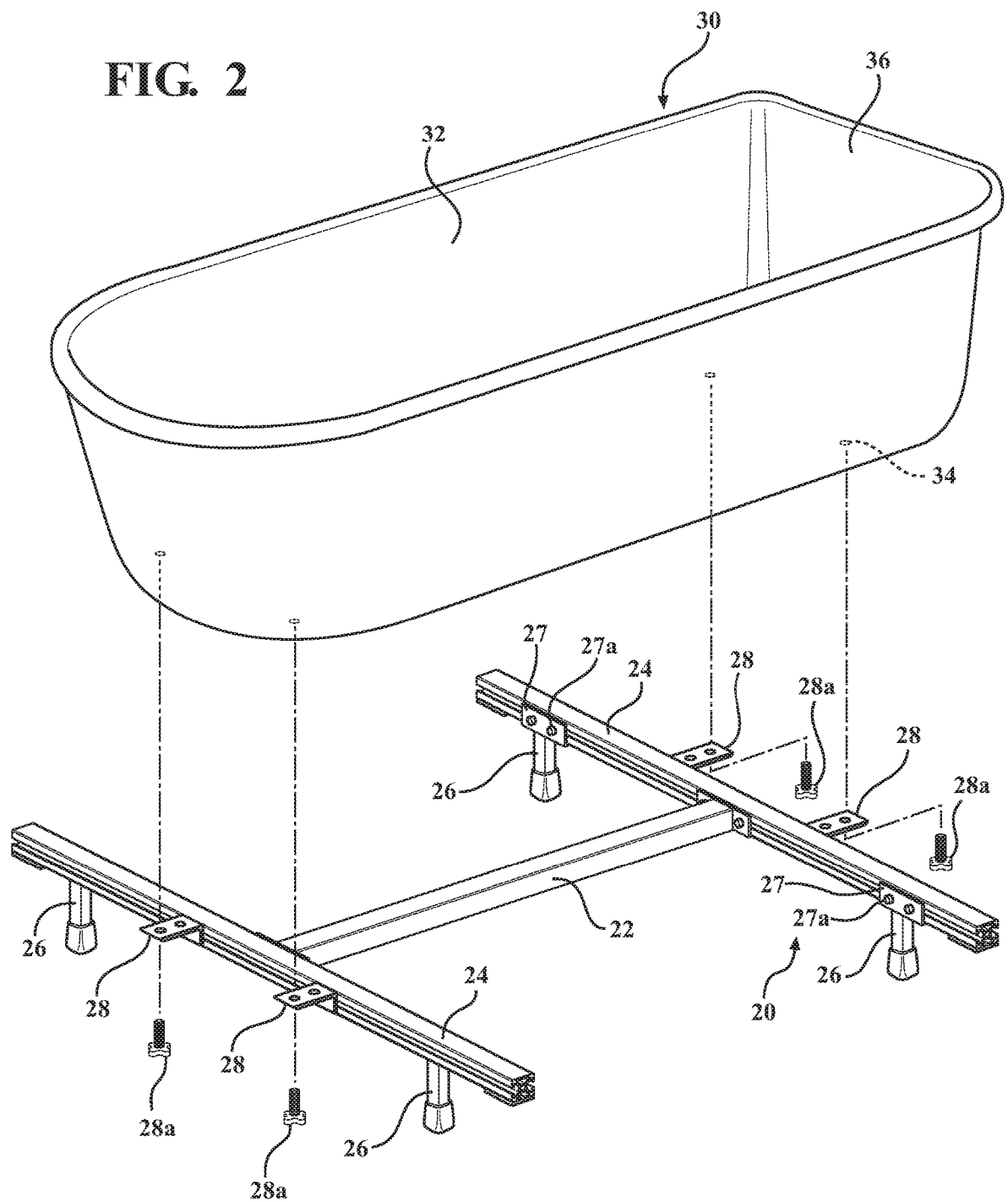
FIG. 2 is a perspective view of a prior art pet washtub exploded from a mounting position on the platform of FIG. 1.

FIG. 2 shows a prior art style pet washtub 30 with substantially rigid walls 36 being assembled to inventive platform 20 with thumb-screws 28a inserted vertically through holes in brackets 28 to engage sockets 34 preformed in the bottom of washtub 30. Mounting features such as brackets 28 on the platform 20 may be configured to accommodate many different types of pet washtub, and the means for securing the washtub to platform 20 are not limited to the illustrated brackets and screws. Brackets 28 may be slide-adjustable on the cross-bars 24 in a manner similar to clamping posts 26, with set screws or bolts 28b engaging lockable slide nuts 28c riding in slots 25.

Figure 3:
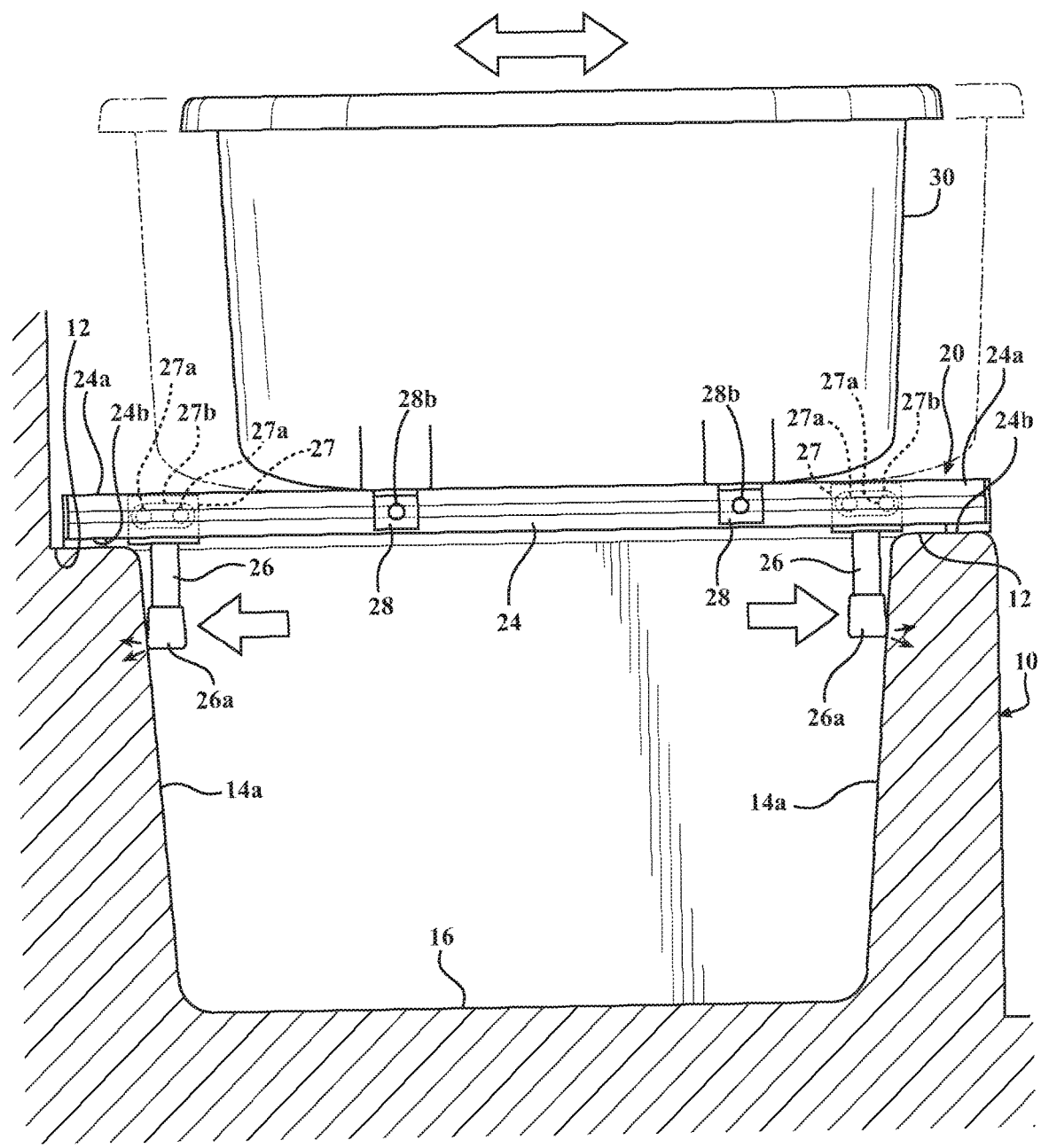
FIG. 3 is an end view of the platform and washtub of FIG. 2 mounted on the bathtub, with the bathtub in section.

FIG. 3 is an end view of the platform 20 and tub 30 mounted on bathtub 10. The arrows represent the outward clamping force of vertical clamping posts 26 on the inner faces 14a of the bathtub sidewalls, which locks platform 20 securely in place. When the platform 20 is clamped in place as illustrated, outer ends 24a of the cross-bars 24 rest on the upper rim 12 of the bathtub 10, and the vertical clamping posts 26 are located inwardly of the outer ends 24a of the cross-bars and above the floor 16 of the bathtub. This creates a generally right-angled, outwardly-tensioned "notch" fit with the bathtub sidewall and upper rim from the inside of the bathtub. This right-angled notch fit is extremely strong and stable, both vertically and horizontally, and prevents any chance of the platform shifting vertically or horizontally under the weight and motion of the pet. If desired, vertical clamping posts 26 may be offset outwardly on their slide mounts 27 to prevent contact between the slide mounts and the sides of the bathtub.

Figure 4:
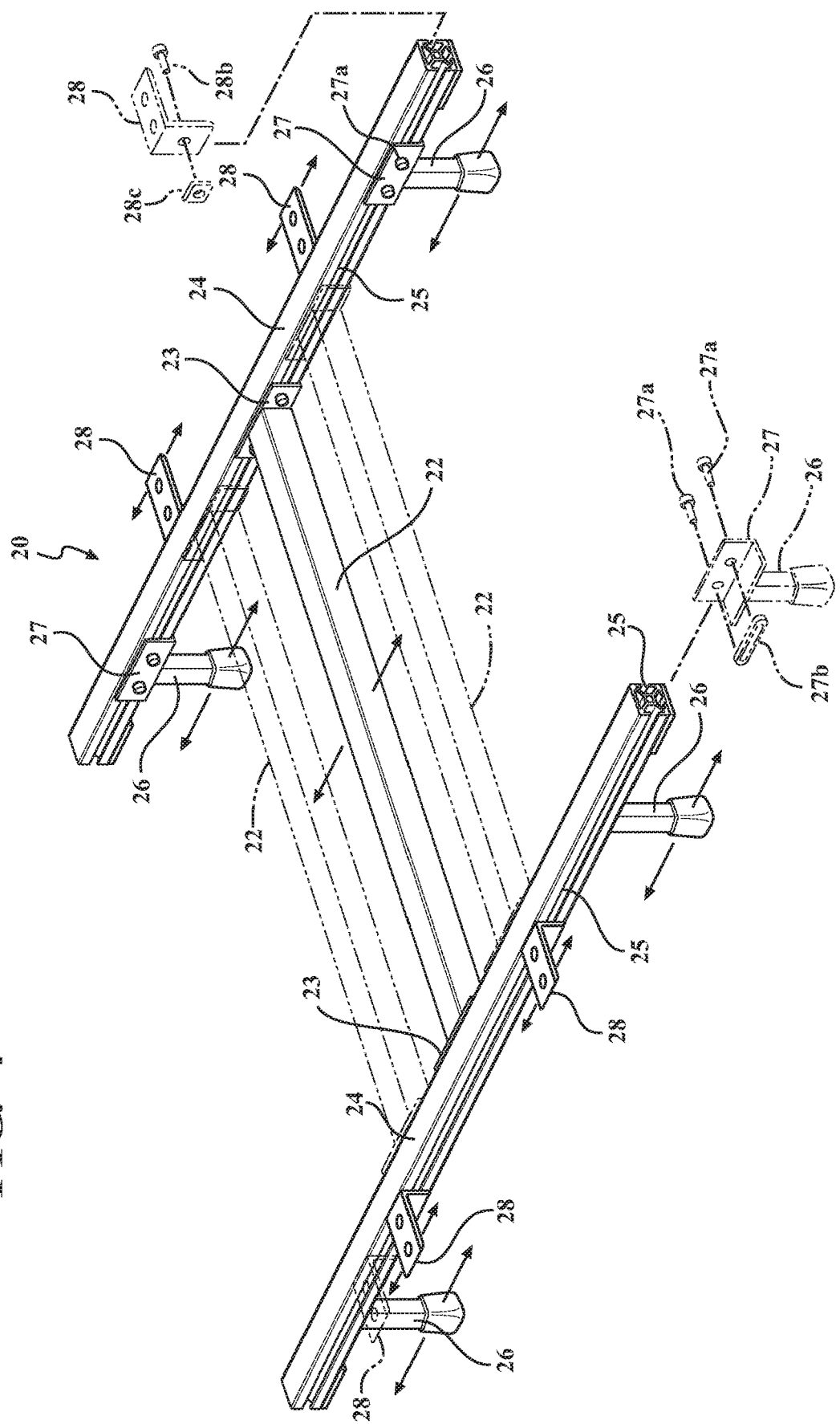
FIG. 4 is a perspective view of the platform of FIG. 1, showing adjustment of various components in broken lines.

FIG. 4 shows the platform 20 with arrows representing the transverse adjustments of central beam 22 on cross-bars 24 through slide mounts 23 (similar to slide mounts 27 on vertical clamping posts 26); of vertical clamping posts 26 on cross-bars 24 through slide mounts 27; and of washtub mounting brackets 28 on the outer sides of cross-bars 24. It would also be possible to make cross-bars 24 and/or central beam 22 in a telescoping configuration or to supply extensions or extended versions of the cross-bars 24 and/or central beam 22, for even more adjustability to fit different bathtub sizes if desired. The metal bar or tubing illustrated for the cross-bars 24 is a commercially available rectangular type using T-slots in the side and bottom faces of the bars, with correspondingly configured slide brackets or nuts riding in the slots to receive the ends of connectors from central beam 22, cross-bars 24, and tub mounting brackets 28 in known manner, but other known types of suitably strong bar or tubing and other known types of slide-adjustment connections for the various moving parts could be used. The bars for platform 20 may also take different cross-sectional configurations, and may be solid or hollow, and are not limited to the rectangular cross-section with T-slots shown in the drawings.

The sliding connections of the various parts of platform 20 allow the platform 20 to be disassembled into a compact package for transport, sale, or storage. For example, brackets 28 can be slid off the ends of their respective cross-bars 24; vertical clamping posts can be slid off the ends of their respective cross-bars; and cross-bars 24 can be slid off the ends of central beam 22, all by loosening the locking features such as the illustrated set screws or bolts on the respective slide mounts to unlock the associated slide brackets or nuts riding in the slots.

Figure 5B:
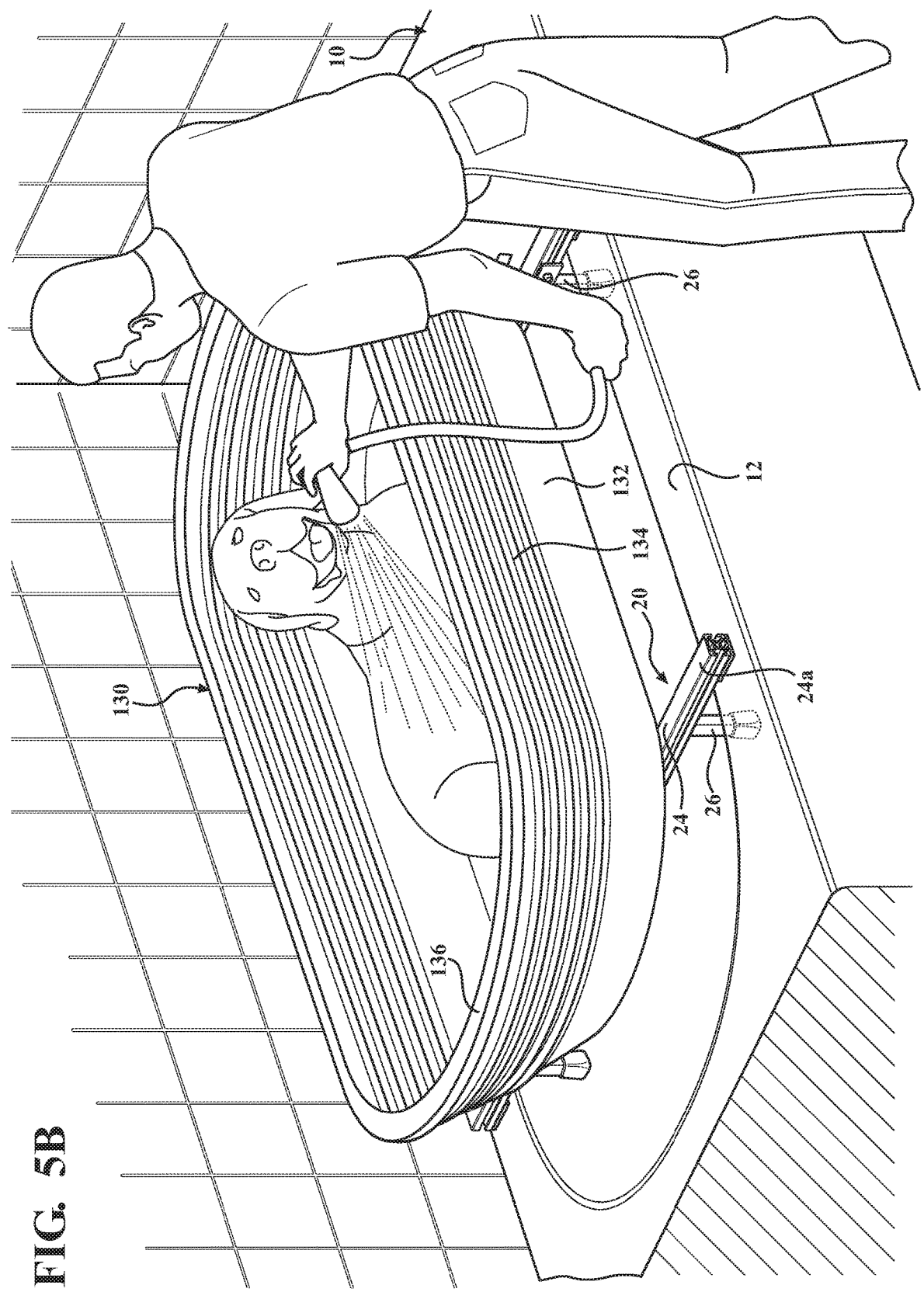
FIG. 5B is similar to FIG. 5A, but with the upper sidewall of the washtub raised to its full height while a dog is washed.

FIGS. 5A and 5B show an inventive collapsible washtub 130 mounted on platform 20, for example with screws through mounting brackets 28 into threaded sockets on the underside of the washtub, substantially the same as shown and described above with respect to washtub 30 in FIG. 2. The sidewalls of washtub 130 include a substantially rigid, non-collapsible lower sidewall 132 and a substantially flexible, collapsible upper sidewall 134 capable of holding its shape when raised to its maximum height. Collapsible upper sidewall 134 is preferably capped by a substantially rigid upper rim 136. The substantially rigid, non-collapsible portions of the washtub 130 may be made from various known types of plastic used for making tubs, e.g. HPDE or similar, while the upper collapsible sidewall 134 is preferably made from a silicone-type rubber known for use in collapsible sidewall dishware and tubs.

The configuration of a fully collapsible upper sidewall 134 with a rigid upper rim 136 on top of a rigid, non-collapsible, contiguous lower sidewall 132 allows the rim to be dropped to a convenient lower height (FIG. 5A) for entry and exit. The lowered rim 136 resting on the lower sidewall 132 through the collapsed upper sidewall remains sufficiently strong and supportive to handle the weight of larger pets as they climb in and out. Once the pet (usually a dog D) is in the washtub 130, the upper sidewall 134 can be pulled back up to its full height (FIG. 5B) to better contain the pet and the spray water during a bath. Washtub 130 may also be provided with a harness or tie system to further help restrain the dog during a bath.

Figure 6:
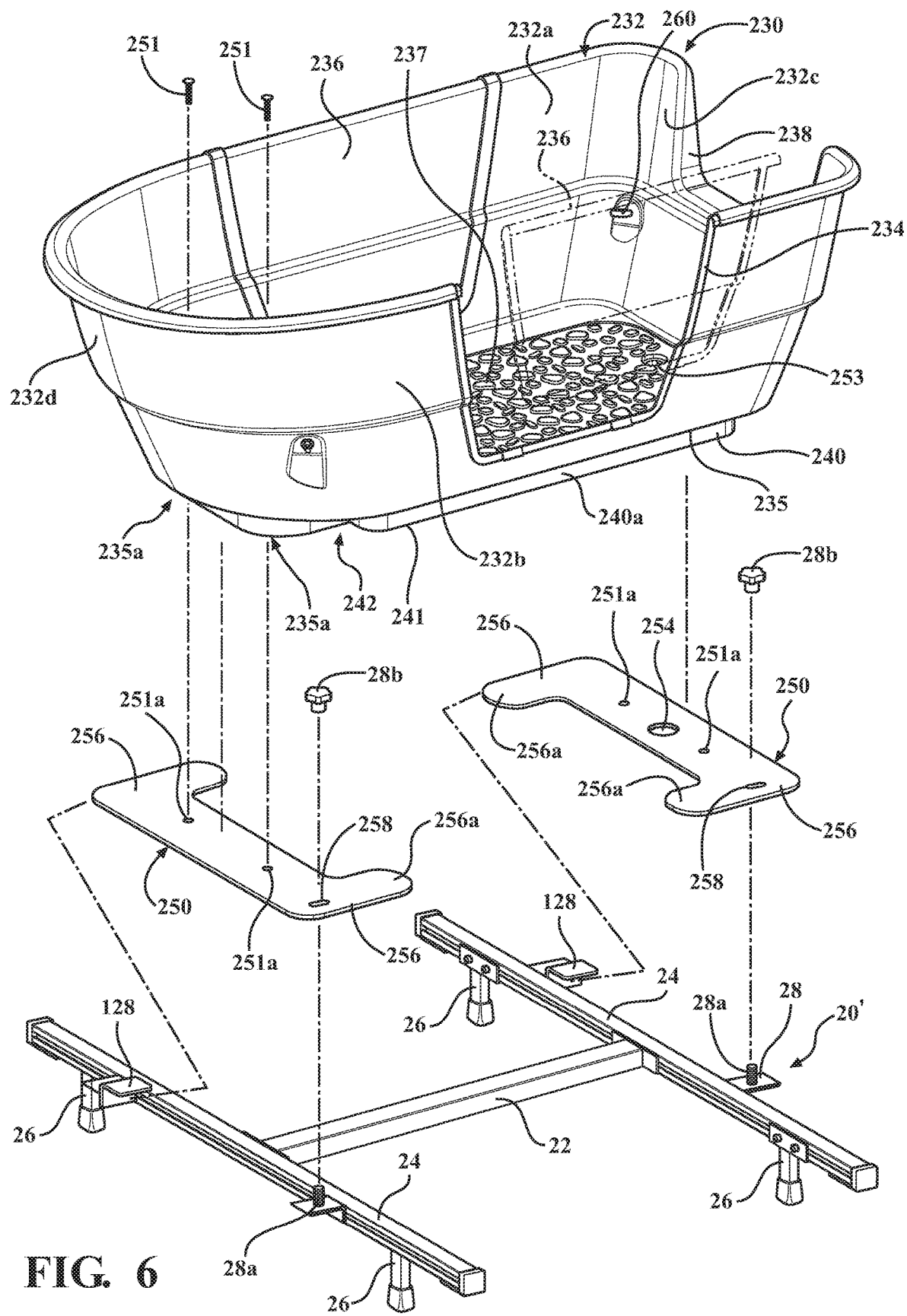
FIG. 6 is similar to FIG. 2, but shows the support platform modified with different wash tub mounting features to accommodate a modified washtub.

FIG. 6 shows a modified washtub 230 having a substantially rigid sidewall 232 with inner side 232a, outer side 232b, rear end 232c, and front end 232d. Washtub 230 has at least one side entry opening 234 sized for a pet in one of the sidewalls, with a vertically removable door 236 engaging the opening 234 with a water-resistant fit. At least the rear end 232c of the washtub 230 includes a control access opening 238 for ease of operating adjacent bathtub faucet or shower controls C or similar.

In the illustrated example, door 236 includes a pair of spaced upper curved tabs 236a that mate vertically with a curved upper rim 233 of the washtub sidewall 232 adjacent each side of opening 234. The lower end of door 236 includes flat locking tabs 236b with inner beveled portions to removably snap over mating beveled projections 233b formed adjacent the lower end of the entry opening in the tub sidewall. The edges of door 236 coextensive with the edges of opening 234 may overlie or underlie the door edges to reduce splashing and water leakage, although a watertight seal is not necessary.

Washtub 230 has a substantially rigid lower bottom or base portion 240, for example of molded plastic such as polyethylene, preferably with its exterior lower surface 241 flat and spaced an inch or two from the bottom floor 235 of the main washtub body, as shown in FIGS. 6 through 9. Ideally the washtub (sidewalls, bottom floor, and lower base) is molded as a unitary body from a plastic material, although other materials and manufacturing methods could be used. While a base portion distinct and extending from the bottom floor 235 of the washtub is illustrated and currently preferred, it is also possible for the floor 235 of the washtub to comprise the bottom-most portion of the tub, perhaps with an increased thickness for the purpose of receiving fasteners or connectors.

Figure 7:
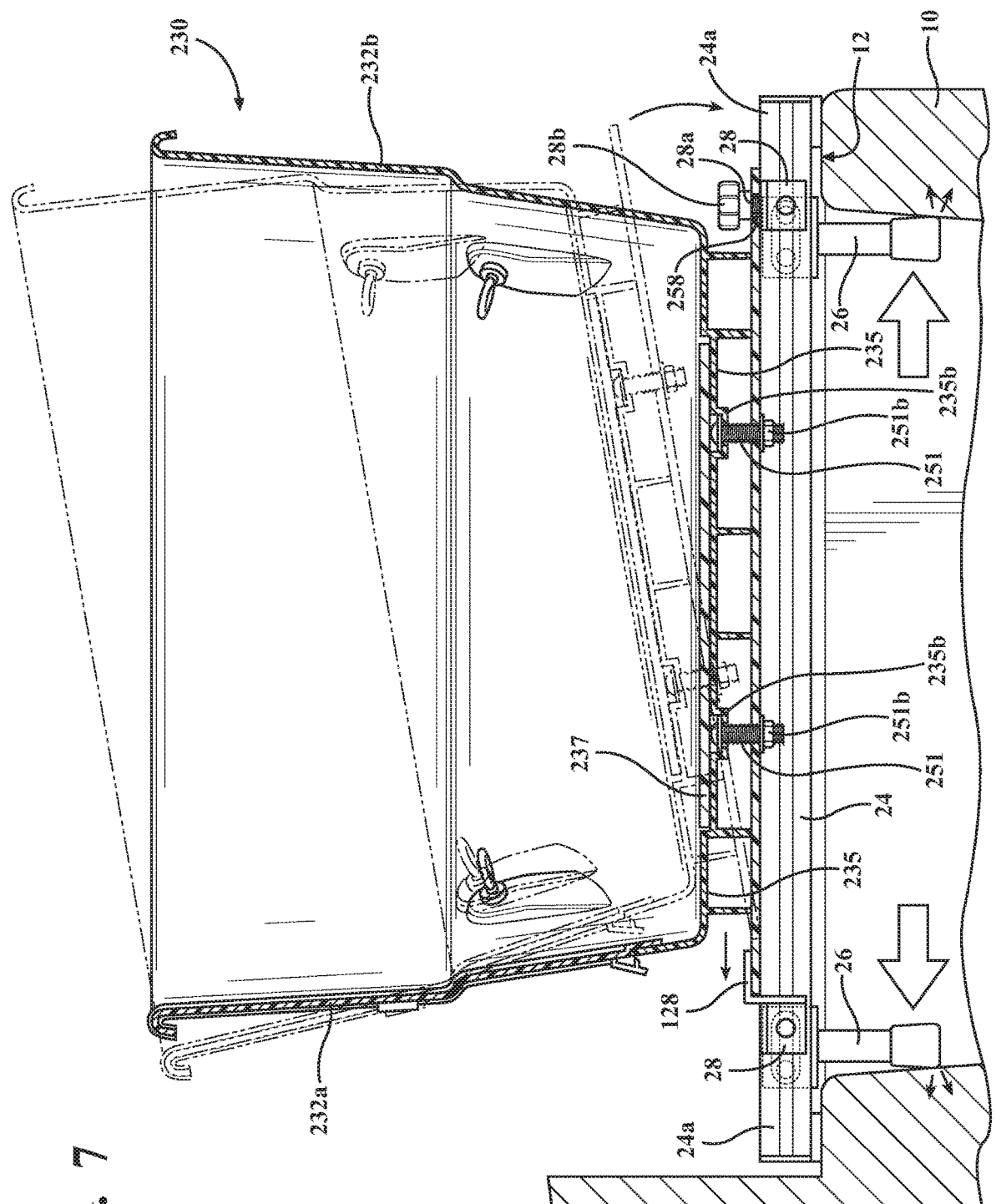
FIG. 7 is similar to FIG. 3, but shows the modified washtub being mounted to the installed support platform with modified mounting features.

The vertical edges 240a of the lower base 240 may be recessed inwardly from the sidewalls and ends of the washtub, as best shown in FIG. 7 but visible in other Figures as well. Alternately, or additionally, recesses 242 may be formed in the corners of bottom 240. Either way, the vertical spacing of the lower surface 241 of base 240 from floor 235 coupled with such inwardly recessed portions as sides 240a and/or corner recesses 242 creates clearance at or near the corners of the washtub relative to outer portions 256 of locking plates 250 secured to the bottom of the washtub.

Locking plates 250 comprise substantially rigid flat members, for example made from lightweight metal or strong plastic, secured to the bottom of the washtub and located at or near the ends or corners of the washtub. In the illustrated example, locking plates 250 are removably attached to the washtub with bolts or other connectors 251 extending through aligned openings 251*a*, 235*a* formed in the locking plates and the bottom of the washtub. Other methods of removable connection are possible, but strong mechanical connectors such as bolts 251 are preferred. In the illustrated example, the holes 235*a* in the washtub for bolts 251 are formed in recesses or sunken nubs 235*b* formed through the floor 235 of the washtub body and extending downwardly into base 240, although the holes 235*a* might alternately be formed as blind bores from the bottom side of the washtub not fully penetrating floor 235. Bolts 251 may secure the locking plates to the washtub by various means such as threads formed in one or both sets of the aligned openings, or locking nuts 251*b* as illustrated.

Locking plates 250 may alternately be permanently secured to the bottom of the washtub, for example with a permanent adhesive, by insert molding, or by being integrally formed with the bottom of the washtub. In the latter case, each locking plate 250 may actually comprise two separate outer end portions or "wings" 256 extending beyond the bottom and/or sides of the washtub, rather than a unitary plate structure running across the width of the washtub as illustrated.

The outer end portions or wings 256 of the locking plates 250 are spaced from the lower exterior surface and/or the sides of the washtub, in the illustrated example being spaced vertically from the lower exterior surface 241 of the bottom 240 at the corners, and further being spaced laterally outward relative to the sidewalls 232*a* and 232*b* of the washtub, in order to provide clearance for the plate ends 256 to engage platform mounting features at the inner and outer ends of the platform cross-bars 24. While the outer end portions 256 preferably extend beyond the corresponding sidewalls of the washtub, the clearance between the outer end portions 256 and floor 235 created by base 240 and its recessed sidewall and/or corner cutouts 242 may be sufficient for the outer end portions to engage the mounting structure on the platform cross-bars.

Figure 6A:
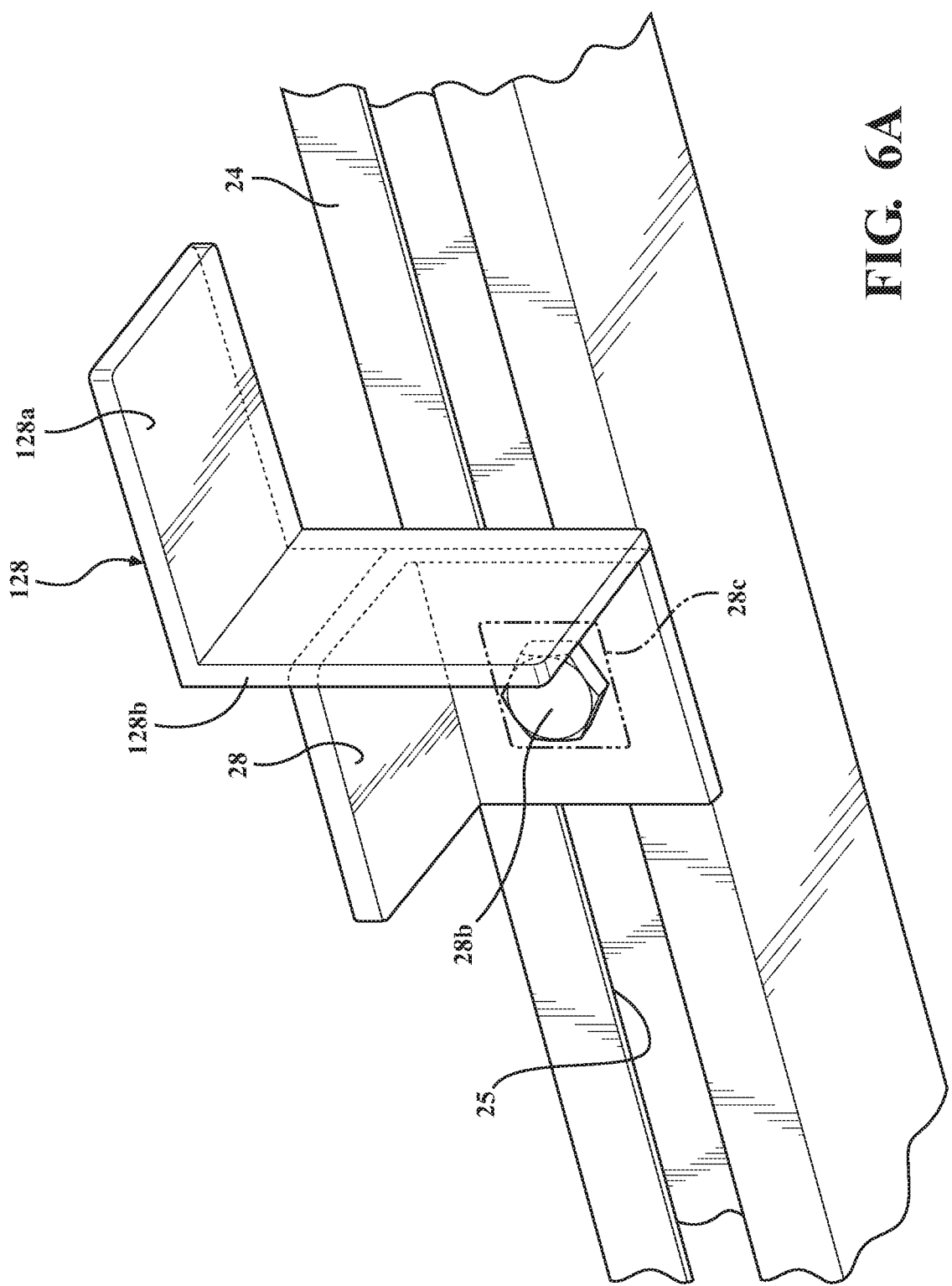
FIG. 6A is a detail bottom perspective view of one of the modified washtub mounting features of FIG. 6.

Referring to FIGS. 6, 6A and 7, modified platform 20' is substantially identical to platform 20 shown in FIGS. 1-5, with the exception of modified inner mounting features 128 that allow for a horizontal sliding engagement of the inner end portions 256 of locking plates 250 therewith. Modified inner mounting features 128 in the illustrated example comprise angled, generally L-shaped raised flanges mounted to the inner ends of cross-bars 24 with sufficient spacing from the cross-bars to receive the edges of the end portions 256 of the locking plates thereunder, i.e. between the upper flange portion 128*a* and the upper surface of the associated cross-bar 24. Modified plate mounting features 128 are preferably slide-adjustable to different locked positions on the cross-bars in a manner similar to that shown for brackets 28 in FIGS. 1-5 above, and the L-shaped flanges 128 may be formed as additions to the brackets 28.

The outer mounting features on the outer ends of cross-bars 24 may be the same brackets 28 shown in FIGS. 1-5, configured for vertically receiving and securing the outer ends 256 of locking plates 250 with thumbscrew structure similar to that shown in FIG. 5. However, in FIGS. 6-9, mounting features 28*a* are preferably fixed threaded studs extending upwardly from brackets 28 to protrude through suitable openings in the locking plates such as slots 258, with nuts 28*b* engaged with the studs to securely lock the plates 250 to the platform. Outer mounting brackets 28 on the modified platform 20' are preferably slide adjustable and lockable on cross-bars 24 as in earlier Figures.

One or both locking plates 250 may include drain openings 254 aligned with one or more corresponding drain openings 253 formed in the end(s) of washtub 230.

FIG. 7 shows the horizontal sliding motion used to mount washtub 230 to modified platform 20'. First, the edges of the outer ends 256 of the locking plates situated on the inner side of the washtub 230 (the side opposite the person installing the washtub) are engaged substantially horizontally with the inner mounting flanges 128, by inserting them beneath the upper flange portions 128*a*. The outer sidewall 232*b* of the washtub is then aligned vertically with outer mounting brackets 28 so that the holes or slots 258 in the outer ends 256 of the locking plates 250 on the outer sidewall 232*b* of the washtub are aligned with the outer brackets 28, and studs 28*a* can subsequently be inserted therethrough and the plates locked thereto with nuts 28*b*.

Figure 8:
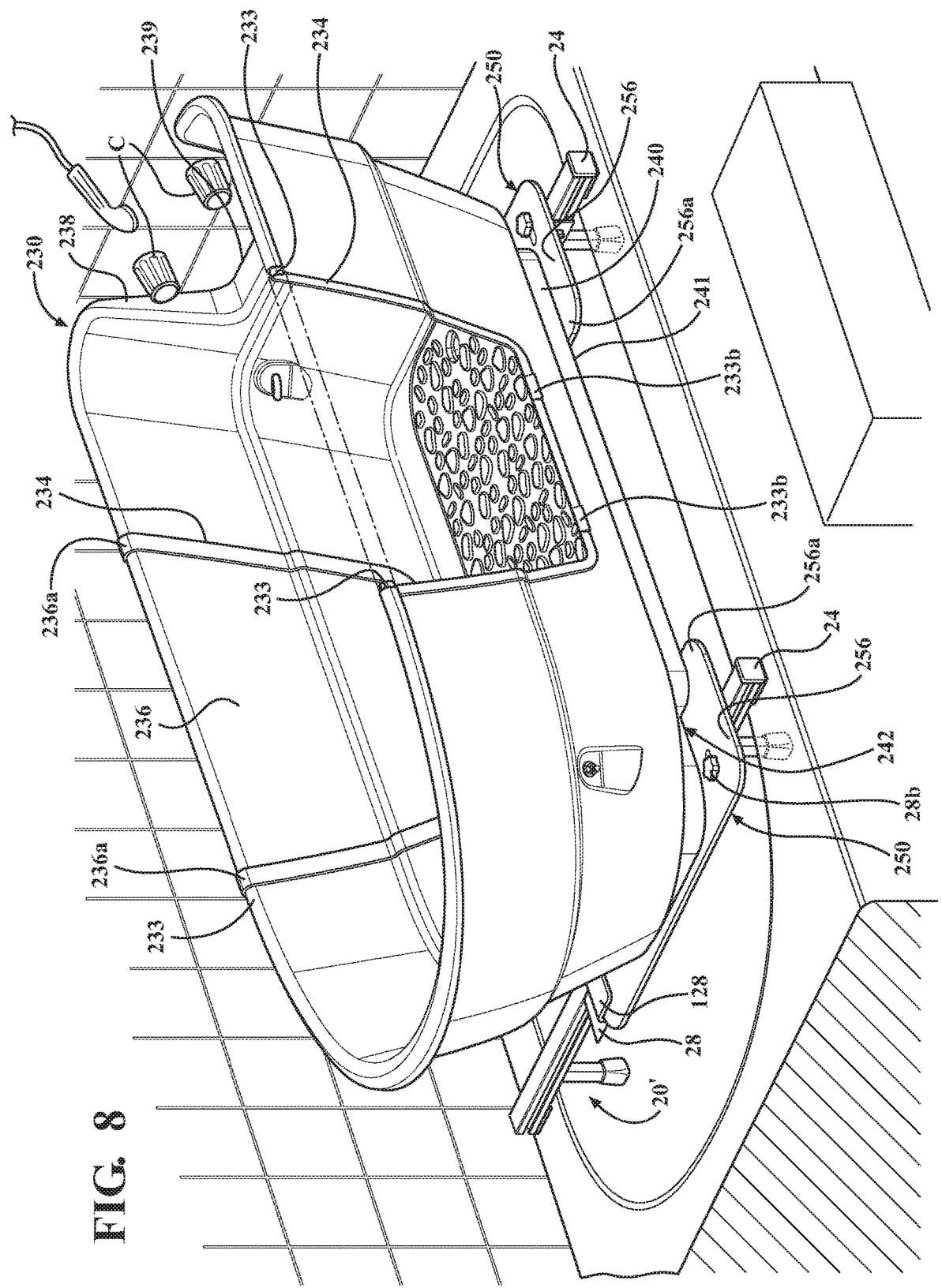
FIG. 8 is similar to FIG. 5A, showing the modified support frame and washtub combination of FIG. 6 mounted in a bathtub.

As shown in FIGS. 7 and 8, the corner recesses 242 formed in the bottom portion 240 of the washtub allow clearance for engaging screws or bolts with the bracket mounting features and for visual alignment of the outer ends 256 of the locking plates with their respective inner and outer mounting features 128, 28 on platform 20'. Slots 258 may optionally be provided at both ends of each plate 250, so that the tub may be reversed and still engage outer studs 28*a*.

Figure 9:
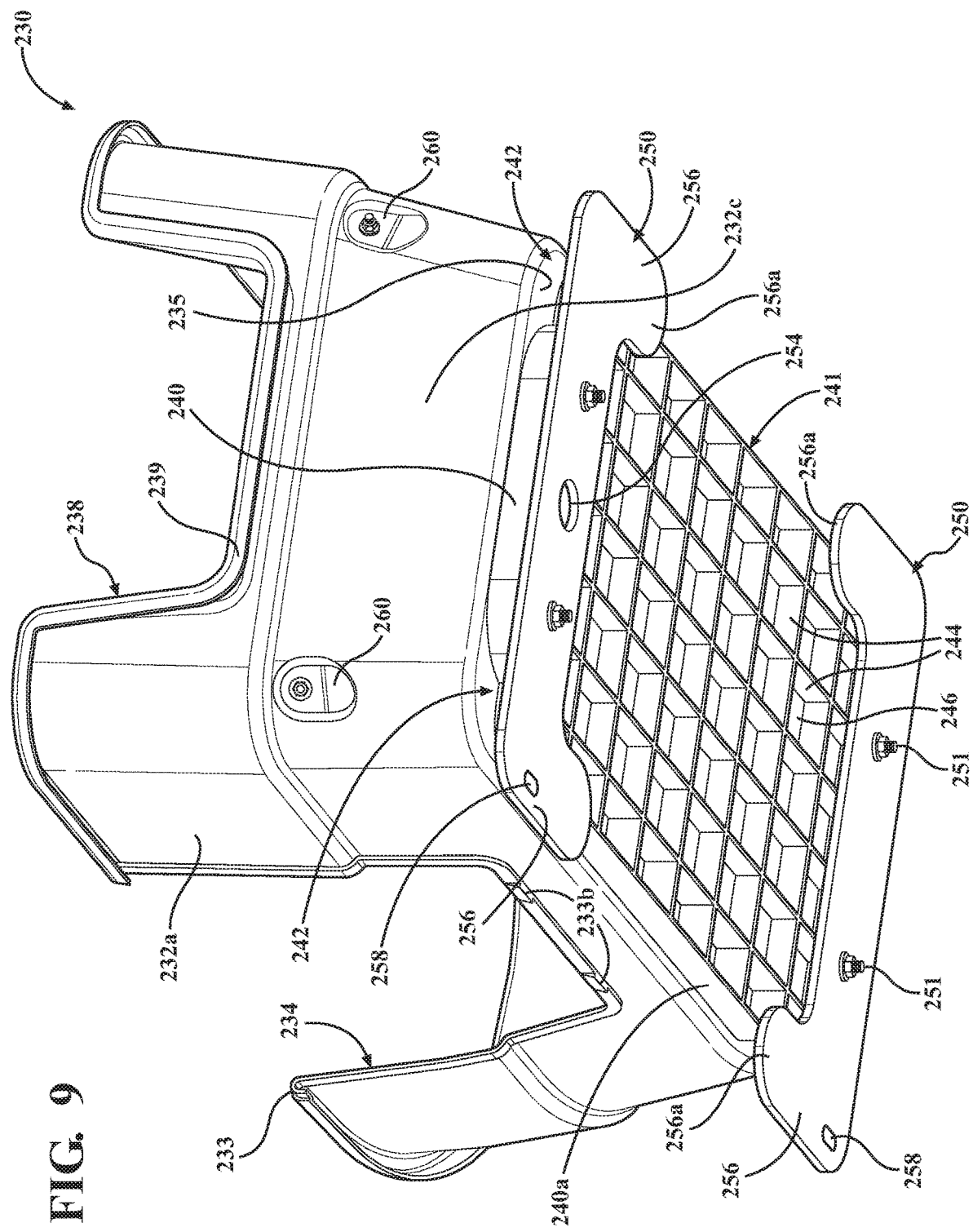
FIG. 9 is a bottom perspective view, from a rear end, of the modified washtub of FIG. 6.

FIGS. 8 and 9 show the outer ends 256 of locking plates 250 provided with longitudinal extension portions 256*a* extending inwardly toward the center of the washtub. These longitudinal extensions 256*a* provide a good gripping area, and if extending underneath and in contact with the lower surface 241 of base 240, help reinforce and stabilize the connection of the locking plates 250 to washtub 230. Additionally these longitudinal extensions 256*a* provide for better aligning the mounting features on the platform with corresponding features on the opposite or "blind" side of the washtub, and provide for better balance while sliding on the cross-bars 24.

Washtub 230 includes other desirable features for washing a pet once the washtub is mounted on platform 20'. Harness tie-down hooks or cleats 260 may be formed in the corners and at other locations on the interior sidewalls of the washtub, to secure the ends of a safety harness or leash helping to keep the pet in the washtub. As best shown in FIGS. 6 and 8, the interior of the bottom surface 235 of the tub may be finished with a removable rubber-like mat 237 that provides a non-slip surface, and that further covers and cushions any exposed connector ends inserted through the floor of the washtub to connect locking plates 250 to base 240.

FIG. 9 shows a preferred, substantially hollow configuration of the base 240 of washtub 230, for example a grid pattern of spaced, intersecting ribs 244 with spaces 246 defined between them for a combination of strength and light weight. The lower edges of ribs 244 are preferably co-planar so that they form a substantially flat lower surface 241.

Control access opening 238 may have an outer edge 239 angled with respect to the end wall 232*c* of the washtub body as illustrated, so that edge 239 creates an essentially planar standing surface perpendicular to the long axis of the washtub, allowing the washtub 230 to be stood vertically on the end wall 232*c* for storage.

Vertically removable door 236 need not have a watertight seal with the sidewall of the washtub 230, as a splash- or water-resistant connection is sufficient to keep wash water sprayed or poured on the pet from splashing out through the sidewall before it drains out the drain opening 254 into the bathtub underneath.

Figure 10:
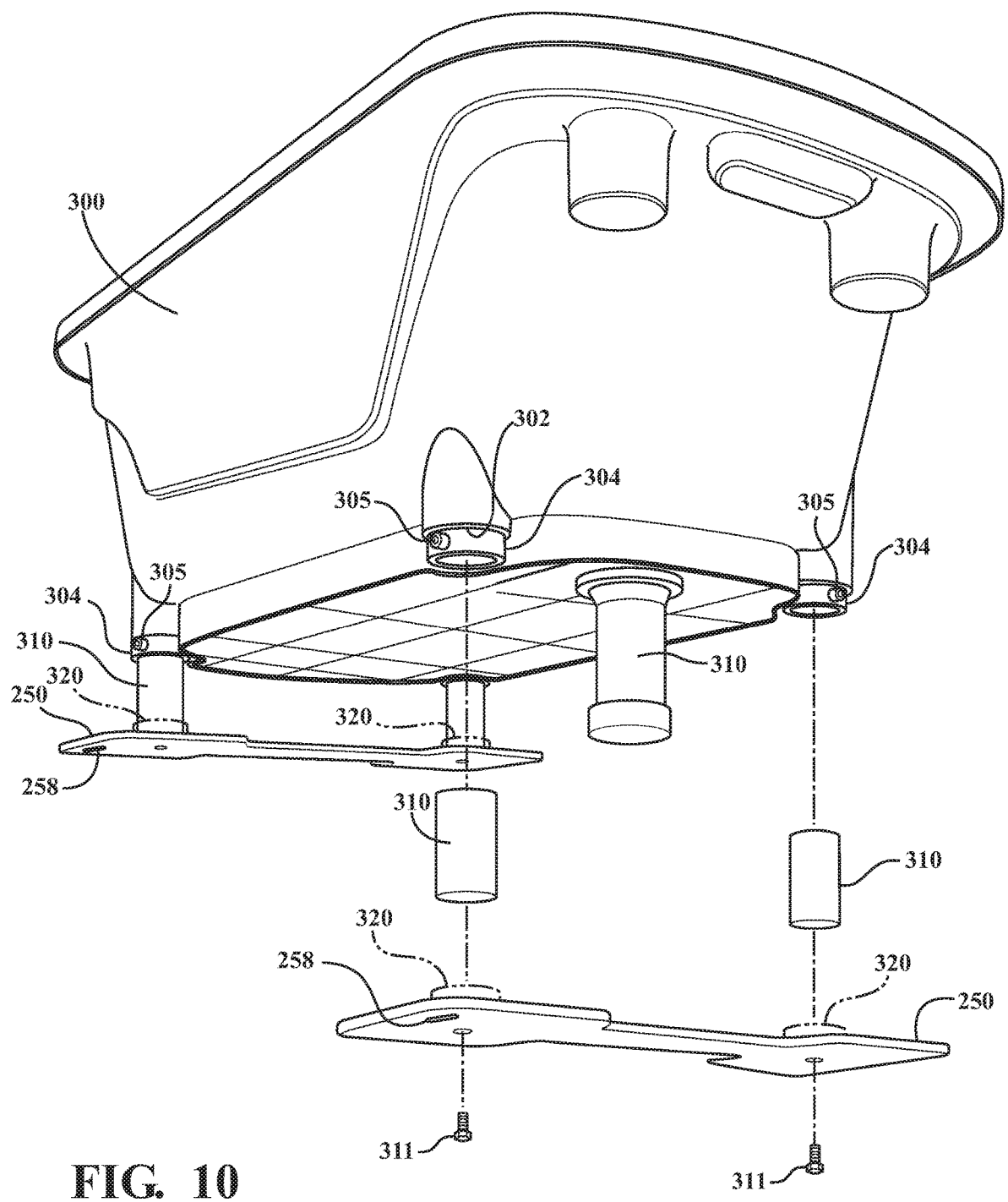
FIG. 10 is a bottom perspective view of a washtub similar to that in FIGS. 6-9, with a modified connection between the bottom of the washtub and the modified mounting features.
Figure 11:
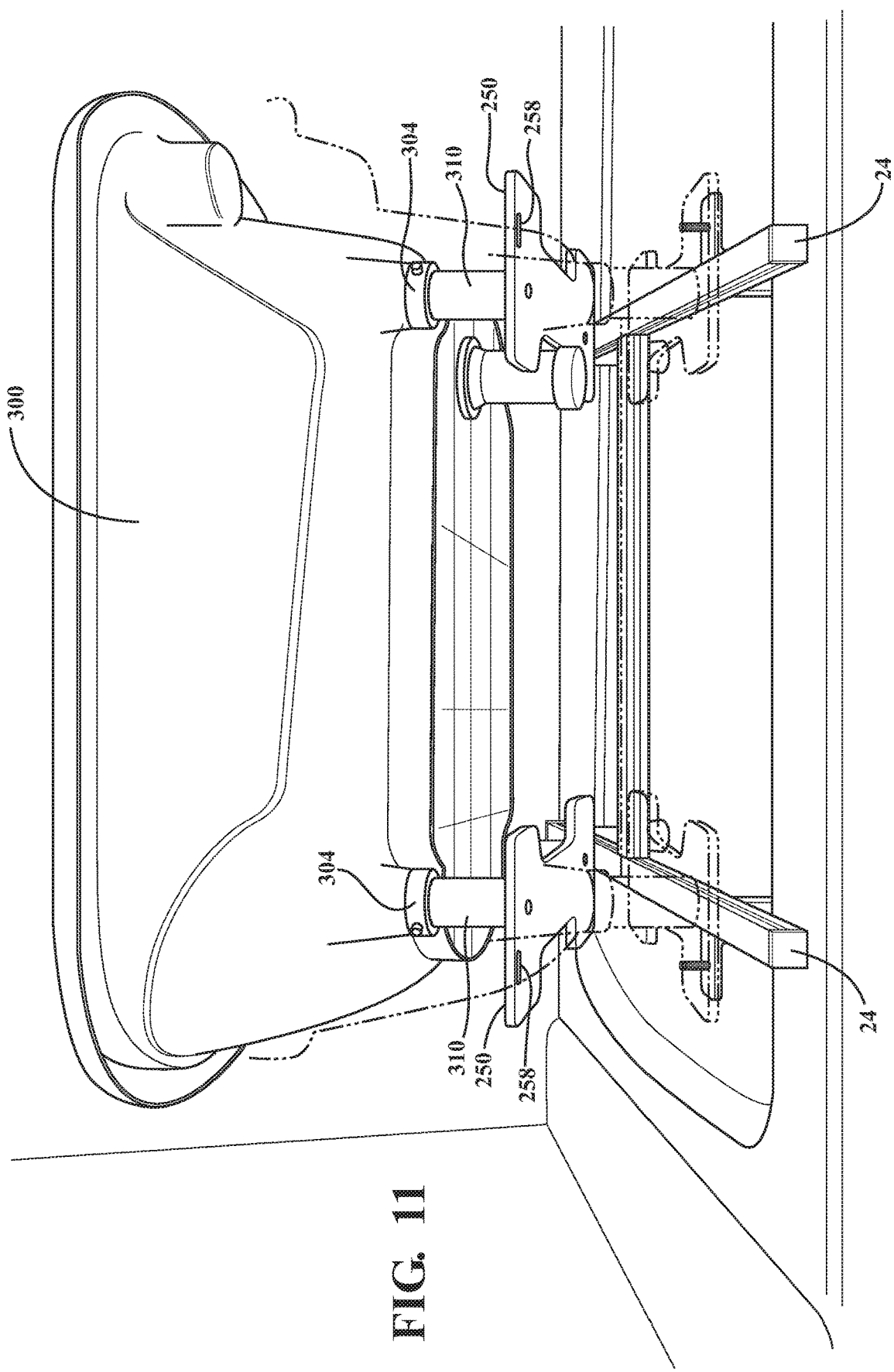
FIG. 11 is a perspective view of the washtub and modified connection of FIG. 10 being mounted on the tub support platform on a bathtub.

Referring next to FIGS. 10 and 11, an alternate connection between the locking plates 250 and the bottom of a pet washtub 300 is illustrated for conveniently raising the height of the washtub relative to the bathtub and mounting platform.

Pet washtub 300 in FIGS. 10 and 11 represents a different prior style of commercially available tub, with sockets 302 formed in the bottom corners of the washtub normally designed to receive removable tubular plastic or metal legs for freestanding outdoor use. Locking plates 250 may be secured to such a washtub in spaced fashion with tubular legs 310 either integrally formed with the locking plates 250 or removably attached to the locking plates, for example by connectors 311 extending through the bottom of the locking plates into solid portions of the lower ends of the tubular legs, or in tubular sockets 320 formed on the upper faces of the locking plates 250 similar to sockets 302 in the bottom of the washtub. Sockets 302 in the bottom of washtub 300 may include leg-locking collars 304 with thumb or set screws 305 or equivalents for more securely locking the upper ends of the legs 310 in the sockets.

If connector legs 310 are removably attached to the locking plates 250, multiple sets of legs 310 of different length may be provided to allow the washtub to positioned at different heights relative to platform 20 and bathtub 10.

It will be understood that while tubular legs 310 and sockets 320 are shown in the illustrated example as a preferred structure for mounting the locking plates 250 to a pet washtub in spaced fashion, in order to raise the washtub from platform 20 and the rim of bathtub 10, other vertical spacing structures between the locking plates and the washtub could be used.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A pet washtub platform and pet washtub combination for use with a bathtub, the combination comprising:
   a generally H-shaped planar platform comprising at least one central longitudinal beam connecting and spacing two transverse cross-bars sized to span and rest upon an upper rim of a bathtub's sidewalls;
   a pair of inner vertical clamping posts extending downwardly from each of the cross-bars below the bathtub rim a distance less than the height of bathtub sidewalls, the inner vertical clamping posts being adjustably positioned on the cross-bars toward and away from each other to engage inner sides of bathtub sidewalls in order to secure the platform to a bathtub;
   a pet washtub configured to be removably mounted on the platform;
   wherein the pet washtub comprises a sidewall and a bottom, the bottom further comprising locking plate structure connected generally parallel thereto and including outer end portions spaced horizontally and/or vertically from the pet washtub adjacent ends or corners of the pet washtub, and further wherein the platform comprises a horizontal tub-mounting feature on an inner end of each of the cross-bars and a vertical tub-mounting feature on an outer end of each of the crossbars, and further wherein the outer end portions of the locking plate structure on an outer side of the pet washtub include apertures configured to be aligned with and receive the vertical tub-mounting features on the outer ends of the cross-bars when edges of the outer end portions of the locking plate structure on an inner side of the pet washtub are located underneath horizontal flanges of the horizontal tub-mounting features on the inner ends of the cross-bars.

2. The combination of claim 1, wherein the inner vertical clamping posts are movable to a clamping position on the cross-bars located inwardly of the outer ends of the cross-bars to define a generally right-angled notch configuration adapted to engage with the bathtub sidewall and rim both vertically and horizontally.

3. The combination of claim 1, wherein the outer end portions of the locking plates extend laterally beyond the sidewall of the pet washtub on opposite sides of the pet washtub adjacent the ends of the pet washtub.

4. The combination of claim 1, wherein the locking plate structure comprises a pair of locking plates removably mounted at opposite ends of the pet washtub and extending widthwise across the bottom of the pet washtub.

5. The combination of claim 1, wherein the bottom of the pet washtub comprises a bottom base with a lower outer surface spaced vertically from the bottom of the pet washtub, the bottom base further being recessed inwardly from the sidewall of the pet washtub.

6. The combination of claim 5, wherein the bottom base of the pet washtub comprises corner recesses recessed inwardly from the sidewall of the pet washtub.

7. The combination of claim 1, wherein the locking plate structure is vertically spaced by a bottom base from a floor of the pet washtub body.

8. The combination of claim 1, wherein the locking plate structure is vertically spaced from the bottom of the pet washtub by legs removably engageable with sockets on the bottom of the pet washtub.

9. The combination of claim 1, wherein the outer end portions of the locking plate structure include longitudinal inward extensions extending toward a center of the pet washtub.

10. The combination of claim 1, wherein the pet washtub comprises a collapsible sidewall.

11. The combination of claim 1, wherein the pet washtub sidewall comprises a door on the outer side of the pet washtub.

12. The combination of claim 1, further comprising vertical locking members engageable with the vertical tub-mounting features to vertically lock the outer end portions of the locking plate structure on the outer side of the pet washtub to the vertical tub-mounting features.

* * * * *